United States Patent [19]

Ando

[11] Patent Number: 5,159,443
[45] Date of Patent: Oct. 27, 1992

[54] IMAGE SIGNAL ENCODING/DECODING APPARATUS AND SYSTEM

[75] Inventor: Fumio Ando, Tokyo, Japan
[73] Assignee: NEC Corporation, Tokyo, Japan
[21] Appl. No.: 546,830
[22] Filed: Jul. 2, 1990

[30] Foreign Application Priority Data
Jun. 30, 1989 [JP] Japan .................................. 1-170071

[51] Int. Cl.⁵ .............................................. H04N 1/40
[52] U.S. Cl. ....................................... 358/75; 358/76; 358/81; 358/261.2
[58] Field of Search ..................... 358/80, 261.1–261.4, 358/262.1, 262.2, 426, 427, 448, 76, 81, 82, 75, 133; 382/56; 341/63, 64, 51

[56] References Cited
U.S. PATENT DOCUMENTS
4,486,784 12/1984 Abraham et al. ..................... 341/63
4,864,392 9/1989 Sato ..................................... 358/80

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

An image signal encoding apparatus that receives a three primary color image signal composed of binary red, green and blue colors. A converter applies predetermined logical conversion to the three primary color image signal to produce first, second and third binary signals. When receiving a signal indicative of black, the converter generates first, second and third binary signals having a first level value. When receiving a signal indicative of white, the converter generates a first binary signal having a second level value and second and third binary signals having the first level value. The image signal decoding apparatus receives the first, second and third binary signals, and converts these binary signals to a three primary color image signal composed of a binary red, green and blue color signals. The reverse converter is operative when receiving three binary signals having a first level to produce a three primary color image signal indicative of black, and is operative when receiving the first binary signal having a second level and the second and third binary signals having the first level to produce another three primary color image signal indicative of white.

9 Claims, 6 Drawing Sheets

IMAGE SIGNAL ENCODING/DECODING APPARATUS AND SYSTEM

BACKGROUND OF THE INVENTION

The present invention relates to an image signal encoding/decoding apparatus for effecting data compression of computer display image and for filing or transferring the compressed data and relates to an image signal decoding apparatus for decoding the coded data by said image signal encoding apparatus. The present invention also relates to data coding/decoding system in a binary three primary color facsimile.

Conventionally, image data composed of three primary colors: red (R), green (G) and blue (B) is utilized and treated as it is when memorizing binary color display image on memory medium in a computer or when transferring the image to a remote location through communication network. Namely, when recording or transferring, in the form of bit map pattern, character or graphic display image formed by a computer program or binary color display image obtained from an image scanner, bright and dark signal of R, G and B three primary colors is normally treated by frame-sequential or line-sequential method, typically in CAPTAIN protocol known as one variation of videotex.

When storing and transferring image information, the most dominant technological problem relates to vast quantity of information. For example, an amount of binary color information may reach up to 768,000 bits when composing a single image in a personal computer, containing 640×400 number of picture elements, thereby causing increase in memory capacity and transfer time duration. In view of this, conventionally various methods have been proposed for efficient compression of data when handling image information. As such data compression method of binary image information, there has been proposed run-length coding method such as MH and MR represented in recommendation CCITTSG VIII T.6 and widely utilized typically in facsimile machine. However, the run-length coding method is specifically designed for monochrome binary image. No compression method is proposed or practiced for color binary image such as computer display image.

SUMMARY OF THE INVENTION

An object of the present invention is to provide an image signal coding apparatus and system having improved coding efficiency of the color image in combination with run length coding method.

Another object of the present invention is to provide an image signal decoding apparatus and system having improved decoding efficiency of the color image in combination with run length coding method.

The image signal encoding apparatus according to the present invention comprises means for providing a three primary color image signal composed of a binary red color signal effective to designate red, a binary green color signal effective to designate green and a binary blue color signal effective to designate blue, and converting means for applying predetermined logical conversion to the three primary color image signals to produce first, second and third binary signals. The converting means is operative when receiving three primary color image signals indicative of black to generate the first, second and third binary signals each having a first level value, and is operative when receiving another three primary color image signal indicative of white to generate the first binary signal having a second level value and the second and third binary signals having the first level value.

The image signal decoding apparatus according to the present invention comprises means receptive of first, second and third binary signals, and converting means for applying predetermined logical conversion to these binary signals to produce three primary color image signals composed of a binary red color signal effective to designate red, a binary green color signal effective to designate green and a binary blue color signal effective to designate blue. The converting means is operative when receiving the first, second and third binary signals each having a first level value to produce three primary color image signals indicative of black, and is operative when receiving the first binary signal having a second level value and the second and third binary signals having the first level value to produce another three primary color image signal indicative of white.

The image signal display apparatus according to the present invention comprises first converting means for effecting first predetermined logical conversion of three primary color image signals composed of a binary red color signal effective to designate red, a binary green color signal effective to designate green and a binary blue color signal effective to designate blue into first, second and third binary signals, second converting means for effecting second predetermined logical conversion of the first, second and third binary signals into the three primary image signals composed of the binary red, green and blue color signals, and display means for displaying an image according to the three primary color image signals outputted from the second converting means. The first converting means operates when receiving the three primary color image signals indicative of black for generating the first, second and third binary signals each having a first level value, and operates when receiving the three primary color image signal indicative of white for generating the first binary signal having a second level value and the second and third binary signals having the first level value. The second converting means operates when receiving the first, second and third binary signals each having the first level value for generating the three primary color image signal indicative of black, and operates when receiving the first binary signal having the second level value and the second and third signals having the first level value for producing the three primary color image signal indicative of white.

The image signal encoding system according to the present invention comprises a logical conversion circuit which converts a set of R, G and B binary signals of red, green and blue three primary color into a set of Y, $C_1$ and $C_2$ binary signals wherein Y=1, $C_1$=0 and $C_2$=0 for white signal and Y=0, $C_1$=0 and $C_2$=0 for black signal; an image memory for storing the Y, $C_1$ and $C_2$ binary signal fed from the logical conversion circuit into a given address in said image memory; an address controller which generates said given address based on a horizontal synchronous signal and a vertical synchronous signals and directs said given address to the image memory; and an encoder for run length variable-length coding of the Y, $C_1$ and $C_2$ binary signals. In the image signal encoding system, the logical conversion circuit comprises: a three-bit decoder which accepts the R, G and B binary signals and outputs eight bit parallel signals for the R, G and B binary signals; a group of AND-/OR gates which carry out the logical operation based on the eight bit parallel signals to convert the R, G and B binary signals into the Y, $C_1$ and $C_2$ signals.

The image signal decoding system comprises: a decoder for decoding the run length variable-length coded data sent from an image signal encoding system into the Y, $C_1$ and $C_2$ binary signals wherein $Y=1$, $C_1=0$ and $C_2=0$ for white signal and $Y=0$, $C_1=0$ and $C_2=0$ for black signal; an image memory; an image memory for storing the Y, $C_1$ and $C_2$ binary signal into a given address in the image moemry; an address controller which directs said given address to the image memory according header information of the run length variable-length coded data and generates reading rate identical to scanning rate of an inputted video signal into the image signal encoding system; and a logical conversion circuit which converts the Y, $C_1$ and $C_2$ binary signals into the R, G and B binary signals. In the image signal decoding system, the logical conversion circuit comprises; a three-bit decoder which accepts the Y, $C_1$ and $C_2$ binary signals and outputs eight bit parallel signals; a group of AND/OR gates which carry out the logical operation based on the eight bit parallel signals to convert the Y, $C_1$ and $C_2$ binary signals into the R, G and B binary signals.

As described above, according to the invention, first binary three primary color image data is compressed and coded such that the first image data is converted into second primary color data Y, $C_1$ and $C_2$ by the following coding formula:

$Y=1$, $C_1=0$ and $C_2=0$ for white signal
$Y=0$, $C_1=0$ and $C_2=0$ for black signal By such coding, image data amount can be reduced, thereby providing advantages such as to reduce transmission time duration during the data transfer through communication network or to reduce capacity of external memory when carrying out filing in the image filing system.

DETAILED DESCRIPTION OF EMBODIMENTS

Figure 1:
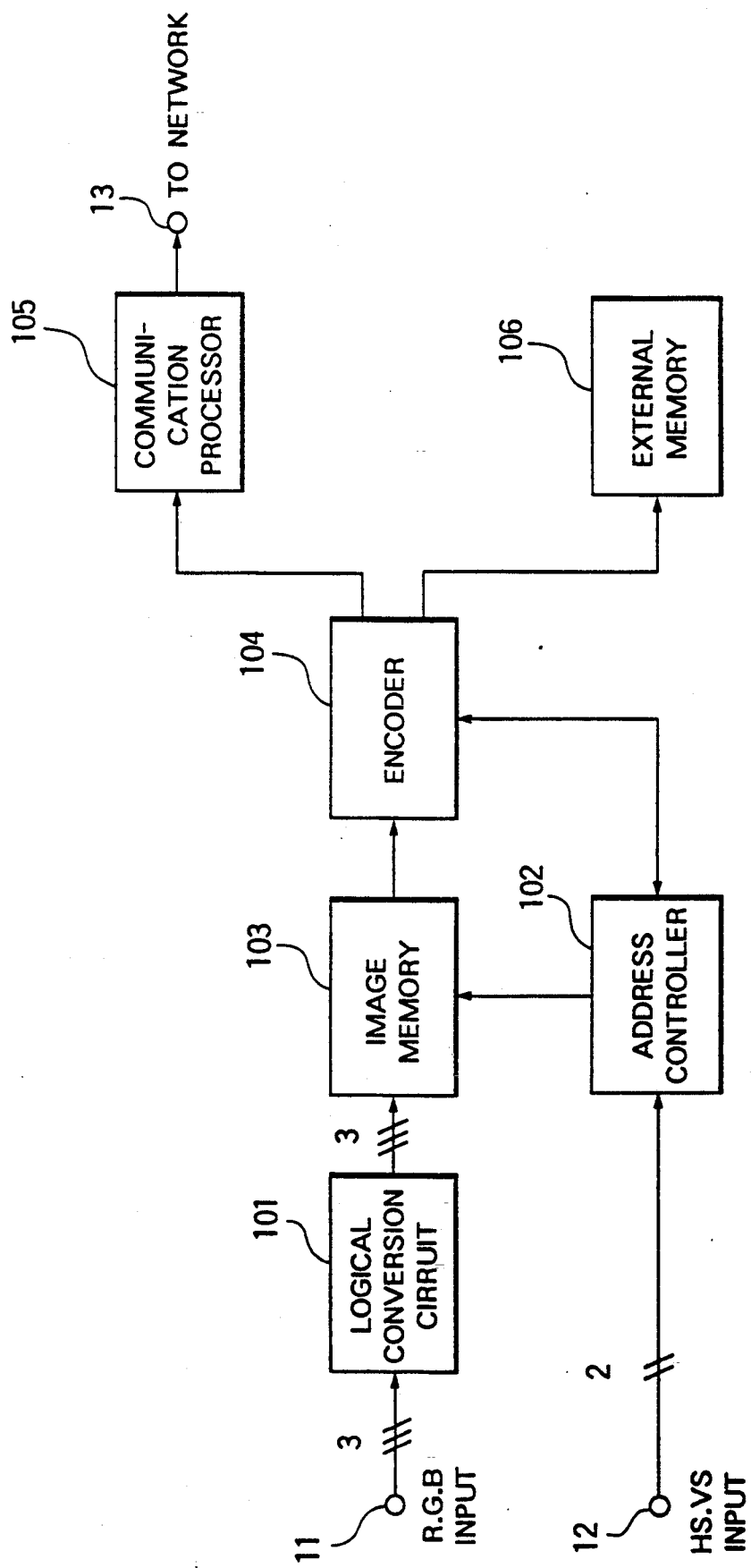
FIG. 1 is a block diagram showing a first embodiment of the invention directed to an encoding system.

First description is given for principle of the present invention. A computer has a display which indicates various information such as characters, graphics and binarized images. The produced image is mostly composed of white and black color among eight different basic color tones. Namely, white and black image information shares major part of overall image information in one frame, and monochrome image of white and black is more frequently displayed than color image.

In the conventional RGB three primary color system, white and black data which occurs most frequently is represented by three bits of R, G and B, thereby causing drawback that overall data is redundant. In the present invention, a first RGB three primary signals are converted into second RGB three primary signals which contain a brightness signal i.e. white and black signal, such that at least the white and black data is composed of a single bit to thereby reduce overall number of bits. In order to effect the conversion, a second bit series is composed, for example, as shown in Table 1.

TABLE 1

| | Logical Table | | | | | | | |
|---|---|---|---|---|---|---|---|---|
| | | | | color | | | | |
| | black | red | green | yellow | blue | magenta | cyan | white |
| input | | | | | | | | |
| R | 0 | 1 | 0 | 1 | 0 | 1 | 0 | 1 |
| G | 0 | 0 | 1 | 1 | 0 | 0 | 1 | 1 |
| B | 0 | 0 | 0 | 0 | 1 | 1 | 1 | 1 |
| output | | | | | | | | |
| Y | 0 | 0 | 1 | 1 | 0 | 0 | 1 | 1 |
| $C_1$ | 0 | 1 | 1 | 0 | 0 | 1 | 1 | 0 |
| $C_2$ | 0 | 0 | 1 | 1 | 1 | 1 | 0 | 0 |

In order to achieve the same effect, the second three primary color set can be composed of various variation other than the Table 1 example. Condition for efficient data compression is to satisfy $Y=1$, $C_1=0$ and $C_2=0$ for white and to satisfy $Y=0$, $C_1=0$ and $C_2=0$ for black. By such feature, data of $C_1$ and $C_2$ for color can be set 0 totally throughout a frame of monochrome image.

The thus converted data is coded through a run length variable-length encoder so as to significantly reduce code amount. The run length variable-length encoding system includes recommended international standard systems such as MH, MR and MMR encodings. In any case, high compression rate can be expected. For example according to MH encoding, with regard to $C_1$ and $C_2$ component data in a monochrome image frame, data on a single scanning line in a bit map pattern can be converted into several or ten-and-several bits of code to thereby achieve high compression rate. According to MR encoding, differential data relative to a preceding scanning line is encoded so that all of the differentials between scanning lines are held 0 to thereby further reduce code amount. In other way, it can be checked whether contents of $C_1$ and $C_2$ bit map memory are all 0 or not prior to encoding. Then, if one color frame data are all 0, the encoding is suspended and skip data transmission. Further, when color information part is smaller than white and black information part in a colored image frame, R, G and B are converted into the Y, $C_1$ and $C_2$ to increase a number of picture elements having data value 0 to thereby reduce code or bit amount throughout an entire frame.

According to the present invention, in order to carry out efficient data compression of binary image information, R, G and B three primary color data are converted into the second three primary Y, $C_1$ and $C_2$ data according to a logic table examplified in Table 1 so as to reduce information data amount. When reproducing image, reverse conversion is effected from Y, $C_1$ and $C_2$ to R, G and B three primary colors to reconstract the original image.

In the above description, a regular display image on CRT is discussed for convenience, where the background is composed of black and the foreground is composed of white and other colors. However, in a facsimile machine, normally the background is composed of white and characters are printed by black, thereby necessitating exchange between white and black data in the brightness signal. This must be considered for more efficient compression since bit length is different for white and black in each run length due to statistical distribution of run length of white and black data. Stated correctly otherwise, in the above description, black represents the background color and white represents the foreground color.

As practical means for realizing the signal conversion or data transformation according to the logical Table 1, There are means of a real time logical circuit type inserted into a video signal circuit or means of data processor type for processing image data stored in a memory. These practical means will be described in detail with reference to first and second embodiments.

Next description is given for embodiments of the present invention in conjunction with the drawings. Hereinafter, the description is given for the first embodiment in which the invention is applied to real time conversion of concurrent three channel image signal. FIG. 1 is a functional block diagram showing the first embodiment directed to a coding system according to the present invention, including functional blocks directly related to the present invention as well as peripheral functional blocks. Referring to the figure, the system has an input signal terminal 11 receptive of video signals of R, G and B three primary colors and another input signal terminal 12 receptive of a horizontal synchronous signal HS and a vertical synchronous signal VS. These five kinds of signals are of concurrent ones and are generally identical to a group of signals fed to a CRT display. A logical conversion circuit 101 converts a set of the R, G and B signals into a set of the Y, $C_1$ and $C_2$ signals and feeds the same to an image memory 103. On the other hand, HS and VS are fed to an address controller 102. The address controller generates a writing address of the image memory 103 based on HS and VS. The image memory 103 is comprised of three memory planes each having a capacity of $N \times M$ bits corresponding to number of picture elements and being constructed such that the respective memory planes memorize Y, $C_1$ and $C_2$ signals, respectively. When one frame of the image signal has been stored, the writing operation is stopped so that the address controller 102 outputs a writing completion signal to an encoder 104. The encoder 104 is of a binary image compression/expansion processor called compression-expansion engine and has a function necessary for compression in a single LSI chip. This encoder 104 can be formed of μPD-72185 produced by NEC Corporation. The image memory 103 is of the dual port memory type and is connected to a memory bus of the encoder 104. The encoder 104 is receptive of the writing completion signal to start run length coding. The coding is, for example, carried out frame-sequentially in the order of Y, $C_1$ and $C_2$ such that four bytes of header are added to a top of color data and three bytes of end-of-frame code EOF are added to an end of the color data each frame. The header is assigned with necessary identification code for various purpose of use such as coding format and image size in addition to ID of color frame. EOF is assigned with a unique code such as EOL code of facsimile.

The coded data may be stored in a buffer memory of a communication processor 105 in some application such that the communication processor 105 transmits the coded data at a given speed and with a given protocol to communication network. In other application, the coded data may be stored in an external memory 106 with being labeled a file name. The external memory can be composed of a fixed disc, flexible disc and CDROM etc.

The encoder 104 operates when completing the coding each frame to produce a coding completion signal to the address controller, and the address controller 102 places the image memory 103 in writing state so as to be ready for a next image. As described above, the address controller 102 operates to generate the address signal effective to carry out writing of an input image signal into the image memory 103 and to effect basic control of the entire system including the encoder 104 such as writing control in synchronization with the inputted VS. In practice, further detailed processing would be needed in control by the address controller 102 over the communication processor 105 and the external memory 106; however such processing is not directly related to the present invention and therefore its description is eliminated in view of its known feature.

Figure 2:
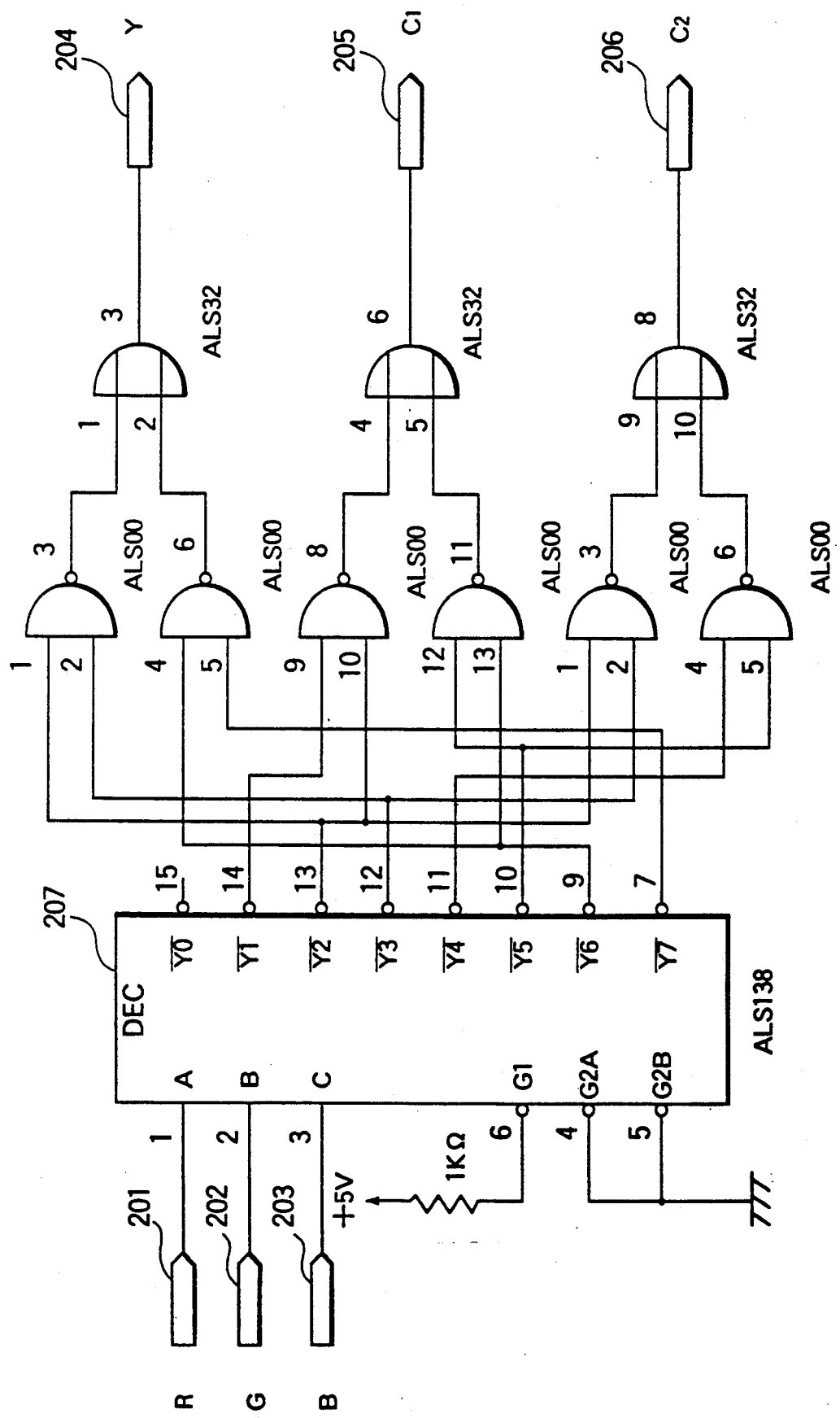
FIG. 2 is a detailed circuit diagram showing a part of the FIG. 1 embodiment.

FIG. 2 is a detailed circuit diagram of the FIG. 1 logical converter 101. In the figure, input terminals 201, 202 and 203 are applied with R, G and B video signals. A three-bit decoder 207 outputs an eight-bit parallel signals which are led through a group of AND/OR gates to output terminals 204, 205 and 206. As readily understood, the gates are logically connected to effect code conversion according to Table 1 so that the terminals 204, 205 and 206 output Y, $C_1$ and $C_2$ signals, respectively.

Figure 3:
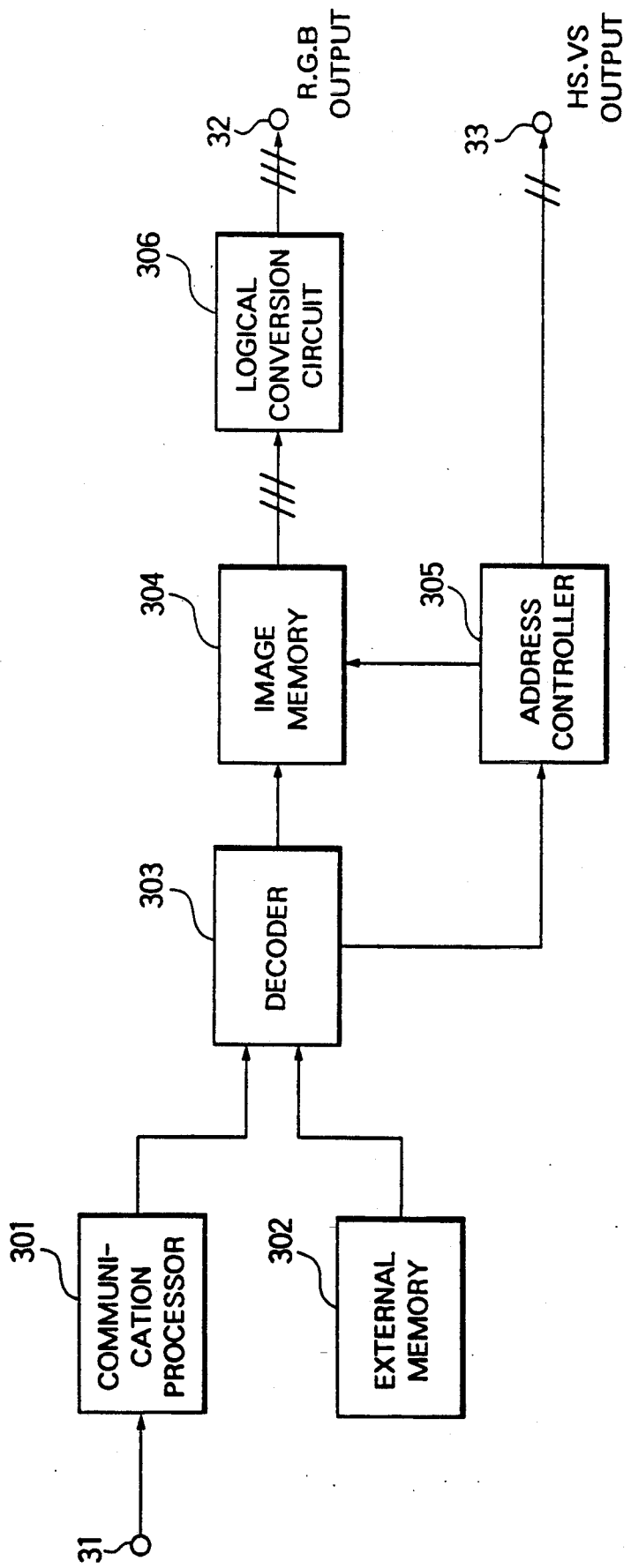
FIG. 3 is a block diagram showing another first embodiment of the invention directed to an decoding system.

The next description is given for a decoding system with reference to FIG. 3. The image signal coded by the encoding system is fed each frame to an input terminal 31 through the communication network. A communication processor 301 extracts original coded image data according to a given communication protocol to sequentially store the extracted data in a buffer memory in the communication processor 301. The buffer memory has FIFO structure in manner similar to the coding system, such that a decoder 303 effects decoding in the order of arriving sequence to retrieve the original Y, $C_1$ and $C_2$ signals and loads the same in an image memory 304 in the form of bit map pattern. The decoder 303 can be also composed of one chip such as μPD-72185. The communication processor 301 reads the header to recognize color to record a bit map pattern on the respective memory plane in the order of Y, $C_1$ and $C_2$. Thus, the image memory 304 is stored with data pattern identical to that stored on the FIG. 1 image memory 103 before the encoding. An address controller 305 recognizes each color frame ID to indicate a top address of a corresponding memory plane to thereby correctly record the image data. The image memory 304 is also of dual port type and is operated to read out the stored data concurrently from the Y, $C_1$ and $C_2$ planes at constant speed without regard to recording speed of the data. The address controller 305 internally determines this reading rate identical to scanning rate of an input video signal in the encoding system. The HS and VS signals representative of the scanning rate are outputted at an output terminal together with R, G and B video signals. The video signals Y, $C_1$ and $C_2$ read out by this scanning rate are inputted into a logical conversion circuit 306 and are then led to another output terminal 32 in the converted form of R, G and B signals.

The group of these R, G and B video signals and the HS and VS signals can be applied to a CRT display to indicate on a screen characters/graphics identical to the original stationary image.

Figure 4:
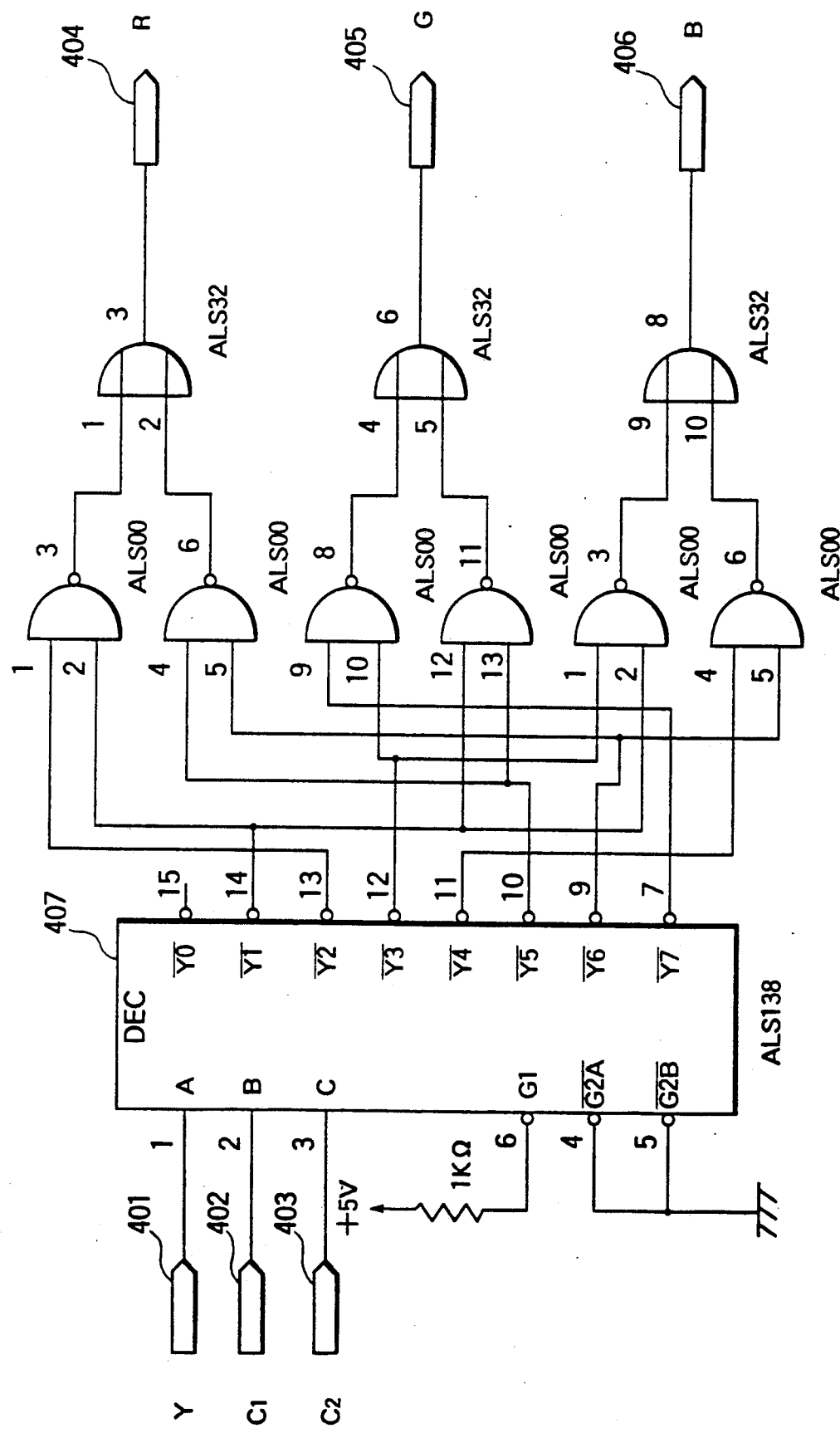
FIG. 4 is a detailed circuit diagram showing a part of the FIG. 3 embodiment.

FIG. 4 shows a detailed circuit diagram of the FIG. 3 logical conversion circuit 306. This circuit has some structure as the FIG. 2 circuit but different in connection to operate inverse logic to the previous one. Therefore its description is eliminated.

In the FIG. 3 structure, an external memory 302 is added for other purpose such that data in the memory 302 may be retrieved at request, then loaded on the image memory 304 through the decoder 303 and further reproduced on a CRT.

Figure 5:
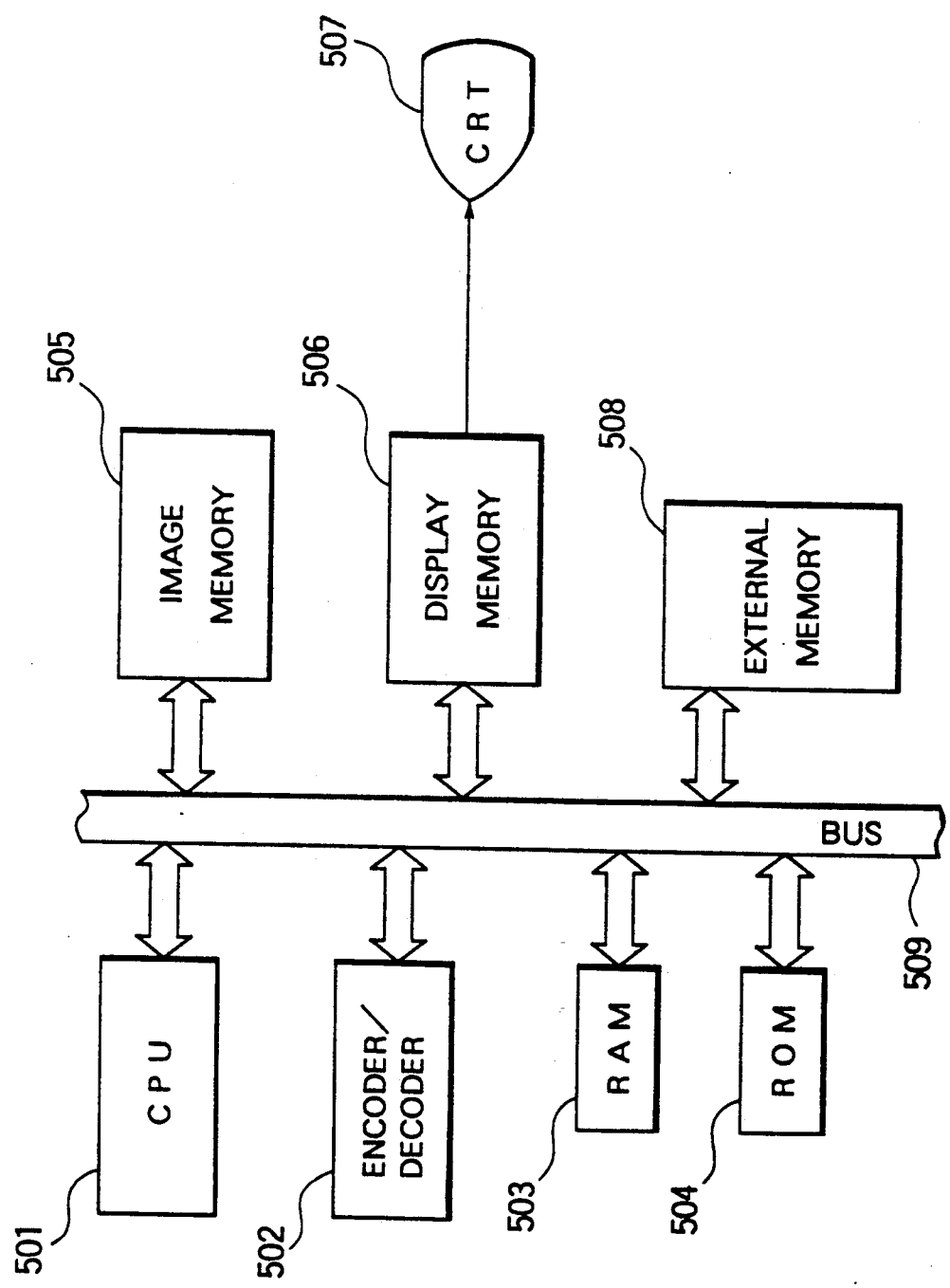
FIG. 5 is a block diagram showing a second embodiment of the invention.

The next description is given for the second embodiment of the invention with reference to FIG. 5. FIG. 5 shows a functional block diagram in which the present invention is applied to an image filing system. While the first embodiment is mainly suitable for communication application of image data, i.e., real time fast transmission, the second embodiment is suitable for a closed system such as computer terminal unit and personal computer, i.e., filing system in combination of data compression/expansion and storage/retrieval.

Referring to FIG. 5, a CPU processor unit 501 is connected through a bus 509 to each of functional blocks. The functional blocks include an encoder/decoder 502, a RAM 503, a ROM 504, an image memory 505, a display memory 506 and an external memory 508. The CPU can be composed of one chip processor such as Intel 80286. The bus may be composed, for example, of a multi-bus for processor based on standard of IEEE 796. Normally, the display memory 506 memorizes an image pattern formed by various kinds of application software. The display memory 506 is called videoram (VRAM) and is composed of a dual port memory device having three planes of R, G and B. The reading operation is continuously carried out by a built in GDC. In case of a personal computer, for example, PC-9801 produced by NEC Corporation, reading is periodically effected at 24.83 kHz of horizontal scanning frequency and at 56.43 Hz of vertical scanning frequency, and the read data is fed to the CRT 507 in the form of R, G and B concurrent signals. The system is constructed such that image data written in the display memory 506 is displayed on the CRT 507 substantially simultaneously to the writing operation.

In the prior art, image data formed by various kinds of application software is directly recorded as each of three primary colors R, G and B on the respective memory planes of the display memory, and each plane corresponds to respective one of the R, G and B video output signals. Next, when effecting compression recording, the contents of the display memory are run length coded by an encoder for each of the three primary color tones R, G and B, and the coded data is recorded on a particular area of a RAM. Then, the coded data is transferred to an external memory while being assigned a file name, data length and primary color ID.

On the other hand, in the second embodiment of the present invention, prior to the coding of image data on the display memory 506, logical conversion processing is carried out and the converted image data is written into the image memory 505. This written Y, $C_1$ and $C_2$ bit map patterns are then run length coded, thereby enabling more efficient compression of image data. When reproducing the image, a corresponding file name is directly designated or is indirectly designated through retrieving means so as to transfer the coded data from the external memory 508 to a particular area of the RAM. Then, decoding processing is carried out by the decoder 502 to load the decoded results on the image memory 505 in the form of Y, $C_1$ and $C_2$ bit map pattern. Subsequently, the Y, $C_1$ and $C_2$ data is applied with logical conversion processing reversely to the recording operation, and the converted results are recorded on the display memory 506 so as to reproduce the original image on CRT. To summarize the difference between the prior art and the embodiment of the invention, in the present invention the image memory 505 having an image data recording area is newly provided such that during the course of recording the logical conversion processing is carried out and the during the course of reproduction the reverse conversion processing is carried out.

Figure 6:
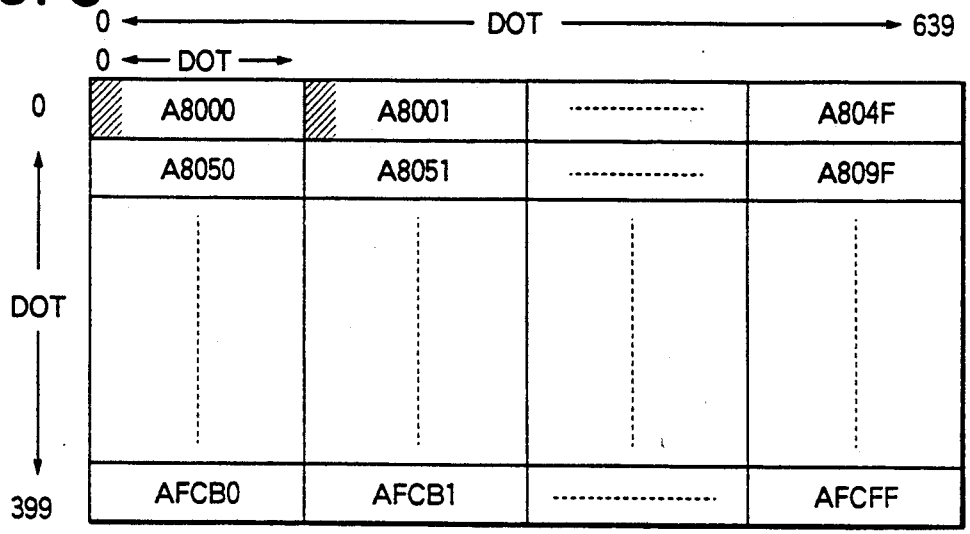
FIGS. 6 and 7 are an illustrative diagram of internal construction of memory, explaining operation of the second embodiment.

The next detailed description is given for the logical conversion operation in the second embodiment of the invention. The display memory 506 has internal data construction as follows. Namely, for example, the image field contains 640×400 number of picture elements. A row of 640 bits are divided each 8 bits into 80 words, and an address is assigned sequentially to each word from the leftmost one. FIG. 6 is a table figure showing correspondence between the picture elements, namely pixels and memory addresses. In the table figure, the numerals in the respective blocks show memory addresses in the form of hexadecimal notation. The upper two digits of each address correspond to a top address of a memory plane. In this example, the top address of the R plane is set to A8000H. In similar manner though not show in the figure, the top address of G plane is set to B0000H, and the top address of B plane is set to B8000H. The arreangement of the lower three bits is common throughout the respective planes. Each of the words has the most significant bit MSB at the leftmost digit. The VRAM has thereon contents of the picture element color tones and data as follows. Namely, when there is provided a series of picture element colors as shown in the bottom section of FIG. 7 (where only the top fifteen pixels are shown), the VRAM has data contents on each of the R, G and B planes as shown in the upper three sections of FIG. 7. In this case, a data content is composed of one byte in the form of two digits of hexadecimal notation.

Figure 7:
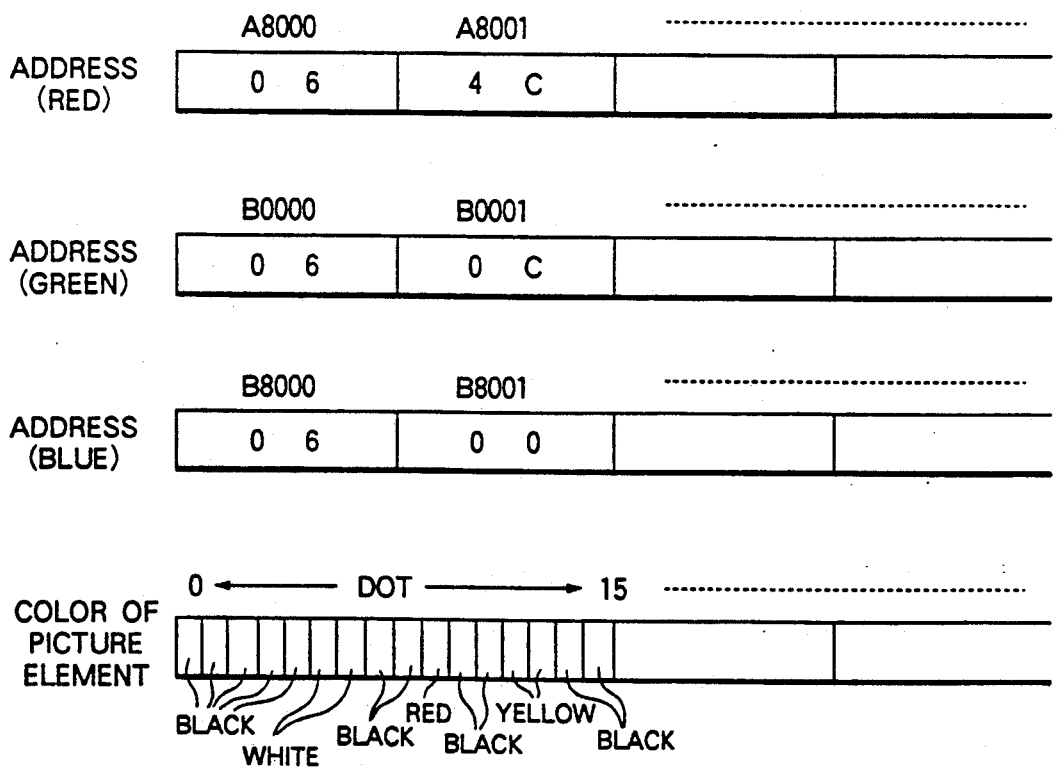

The next description is given for the manner by which the data on the VRAM is logically converted and written into the image memory 505. Firstly, as shown in FIG. 7, data 06, 06 and 06 in the respective top addresses of the R, G and B planes are retrieved such that each data is divided into upper 4 bits and lower 4 bits to reconstruct two words of 12 bits, i.e., 000 and 666. A fixed data of 12 bits is added to upper order of the reconstructed data to produce, for example, 080000 and 080666. The fixed data corresponds to address area of the ROM 504. On the other hand, the ROM 504 is written on its individual addresses with data which is results of the logical conversion according to the logical Table 1 such that 000 and 600 are retrieved. This two word data represents data of 4 bits of the respective Y, $C_1$ and $C_2$. Therefore, the data is subjected to reconstruction reverse to reading of the display memory 506 so that 06, 00 and 00 are respectively memorized in each of the top addresses of Y, $C_1$ and $C_2$ planes in the image memory 505. The respective top address of each plane in the image memory 505 is C8000 (red), D0000 (green) and D8000 (blue), respectively. In similar processing, data 4C, 0C and 00 of A8001, B0001 and B8001 are logically converted so that the data 0C, 40 and 0C are respectively written into the addresses C8001, D0001 and D8001, respectively. By such operation, a set of R, G, and B data in the display memory 506 is sequentially converted into a set of Y, $C_1$ and $C_2$ data and is then written on the image memory 505 according to the identical format. In filing, the contents of the image memory 505 is coded by the encoder 502 to memorize the results on the external memory 508. Such operation can be carried out likewise in the prior art.

The above described logical conversion way is called table look-up method according to software or computer program. In this embodiment, a set of 4-bit three primary color data, i.e., 12 bits are concurrently converted in practical manner rather than that a set of 1-bit three primary color data, i.e., 3 bit are sequentially subjected to the table look-up operation. In this case, since input data has a combination of $2^{12}=4.096$ such that the look-up table requires 4.096 number of addressses while advantageously reducing processing time by about $\frac{1}{4}$.

The table look-up method may have various modifications other than the above described specific example. For example, the table look-up can be carried out by a hardware logic circuit. For this, a personal computer such as PC-9801 series produced by NEC Corporation can be used to display 16 color tones among 4.096 color tones with reference to a look-up table.

Generally, in the filing system, input operation is carried out by a particular operator of data formation and editing, while retrieving and displaying may be carried out by many of general users. Moreover, input of a single image and data requires several minutes of time duration. Therefore, there is general demand that expansive decoding should be finished within several seconds or severalth of second while compressive coding may be allowed to consume long time. In view of this, it is practical to effect conversion from YC to RGB by software, and to effect reverse conversion from RGB to YC by hardware. In detail, the logical conversion circuit exemplified in FIG. 4 is placed on output side of the display memory 506 shown FIG. 5. Y, $C_1$ and $C_2$ data are written into the display memory so that R, G and B video signal output is immediately obtained to display device a desired image on CRT, thereby providing a display device specific to the present invention or a display signal generator.

What is claimed is:

1. An image signal encoding apparatus comprising:
   means for providing a three primary color image signal composed of a binary red color signal effective to designate red, a binary green color signal effective to designate green and a binary blue color signal effective to designate blue;
   converting means for applying predetermined logical conversion to the three primary color image signal to produce first, second and third binary signals, the converting means being operative when receiving a three primary color image signal indicative of black tone to generate the first, second and third binary signals having a first level value and being operative when receiving another three primary color image signal indicative of white to generate the first binary signal having a second level value and the second and third binary signals having the first level value; and
   encoding means for coding run length of said first, second and third binary signals.

2. An image signal encoding apparatus according to claim 1; including coding means for effecting run length variable-length coding of the first, second and third binary signals.

3. An image signal decoding apparatus comprising:
   decoding means for converting run length code into first, second and third binary signals;
   converting means for applying predetermined logical conversion to these binary signals to produce a three primary color image signal composed of a binary red color signal effective to designate red, a binary green color signal effective to designate green and a binary blue color signal effective to designate blue, the converting means being operative when receiving the first, second and third binary signals having a first level value to produce a three primary color image signal indicative of black, and being operative when receiving the first binary signal having a second level value and the second and third binary signals having the first level value to produce another three primary color image signal indicative of white.

4. An image signal decoding apparatus according to claim 3; including decoding means for decoding run length variable-length coded signals into the first, second and third binary signals and feeding these binary signals to the converting means.

5. An image signal display apparatus comprising:
   first converting means for effecting first predetermined logical conversion of a three primary color image signal composed of a binary red color signal effective to designate red, a binary green color signal effective to designate green and a binary blue color signal effective to designate blue into first, second and third binary signals;
   encoding means for coding run length of said first, second and third binary signals;
   decoding means for converting run length code into the first, second and third binary signals; and
   second converting means for effecting second predetermined logical conversion of the first, second and third binary signals into the three primary image signal composed of the binary red, green and blue color signals; and
   display means for displaying an image according to the three primary color image signals outputted from the second converting means, wherein the first converting means operates when receiving the three primary color image signal indicative of black for generating the first, second and third binary signals having a first level value, and operates when receiving the three primary color image signal indicative of white for generating the first binary signal having a second level value and the second and third binary signals having the first level value, and wherein the second converting means operates when receiving the first, second and third binary signals having the first level value for generating the three primary color image signal indicative of black, and operates when receiving the first binary signal having the second level value and the second and third signals having the first level value for producing the three primary color image signal indicative of white.

6. An image signal encoding system comprising: a logical conversion circuit which converts a set of R, G and B binary signals of red, green and blue three primary color into a set of Y, $C_1$ and $C_2$ binary signals wherein Y=1, $C_1=0$, $C_2=0$ for white signal and Y=0, $C_1=0$ and $C_2=0$ for black signal; an image memory for storing the Y, $C_1$ and $C_2$ binary signal fed from the logical conversion circuit into a given address in said image memory; an address controller which generates said given address based on a horizontal sychronous signal and a vertical sychronous signal and directs said given address to the image memory; and an encoder for run length variable-length coding of the Y, $C_1$ and $C_2$ binary signals.

7. An image signal encoding system as claimed in claim 6, wherein the logical conversion circuit comprises: a three-bit decoder which accepts the R, G and B binary signals and outputs eight bit parallel signals for the R, G and B binary signals; a group of AND/OR gates which carry out the logical operation based on the eight bit parallel signals to convert the R, G and B binary signals into the Y, $C_1$ and $C_2$ signals.

8. An image signal decoding system comprising: a decoder for decoding the run length variable-length coded data sent from an image signal encoding system into the Y, $C_1$ and $C_2$ binary signals wherein Y=1, $C_1=0$ and $C_2=0$ for white signal and Y=0, $C_1=0$ and $C_2=0$ for black signal; an image memory for storing the Y, $C_1$ and $C_2$ binary signal into a given address in the image memory; an address controller which directs said given addresses to the image memory according header information of the run length variable-length coded data and generates reading rate identical to scanning rate of an inputted video signal into the image signal encoding system; and a logical conversion circuit which converts the Y, $C_1$ and $C_2$ binary signals into the R, G and B binary signals of red, green and blue three primary color.

9. An image signal decoding system as claimed in claim 8, wherein the logical conversion circuit comprises: a three-bit decoder which accepts the Y, $C_1$ and $C_2$ binary signals and outputs eight bit parallel signals; a group of AND/OR gates which carry out the logical operation based on the eight bit parallel signals to convert the Y, $C_1$ and $C_2$ binary signals into the R, G and B binary signals.

* * * * *

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 1, line 16, delete "memorizing" and insert --storing--;

Column 1, line 17, delete "memory" and insert --storage--;

Column 1, line 20, after "of" insert --a--;

Column 1, line 20, after "pattern" delete "," and insert --which is generated by a--;

Column 1, line 20, after "character" insert --generator--;

Column 1, line 21, after "graphic" delete "display";

Column 1, line 22, after "color" delete "display";

Column 1, line 23, delete "signal" and insert --signals--;

Column 1, line 23, after "B" insert --the--;

Column 1, line 24, delete "is normally treated by" and insert --are normally used as they are by coding series of bits of each primary coder in a--;

Column 1, line 25, delete "method typically in" and insert --manner. A typical example of the aforementioned system is the--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 1, lines 27 and 28, delete "the most dominant technological problem relates" and insert --difficulties arise due--;

Column 1, line 28, after "to" insert --the-- and after "vast" insert --amount--;

Column 1, line 29, delete "quantity" and delete "information" and after "of" insert --data--;

Column 1, line 29, delete "an" and insert --the--;

Column 1, line 30, after "information" insert --(assuming eight colors)--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 1, delete lines 31-45 and insert --in a single image in a personal computer, having 640 x 400 picture pixels, thereby causing a need for large memory capacity and transfer time duration. In view of this, conventionally various methods have been proposed for efficient coding when handling image data. There has been proposed run-length coding methods, such as MH and MR represented in recommendation CCITT SG VIII T.6 and widely utilized typically in facsimile machines. However, the conventional run-length coding method is specifically designed for monochrome binary images. No effective compression method is proposed or practiced for a color binary image such as a computer display image.--;

Column 1, line 49, delete "signal".

Column 1, line 50, after "efficiency" insert --and data compression ratio--;.

Column 1, line 51, after "with" insert --the--;

UNITED STATES PATENT AND TRADEMARK OFFICE
CERTIFICATE OF CORRECTION

PATENT NO. : 5,159,443
DATED : Oct. 27, 1992
INVENTOR(S) : Fumio Ando

It is certified that error appears in the above-identified patent and that said Letters Patent is hereby corrected as shown below:

Column 1, lines 53-55, after "signal" delete "decoding apparatus and system having improved decoding efficiency of the color image in combination with run length coding method" and insert --encoding apparatus according to the present invention comprising means for providing a three primary color image signal composed of binary red, green and color signals, and logical converting means for converting these three signals into one black and white signal Y and a pair of binary color (difference) signals $C_1$ and $C_2$.--;

Column 1, line 56, before "The" insert --Further, another object of the present invention is to provide an image signal decoding apparatus according to the present invention comprising means receptive of Y, $C_1$ and $C_2$, and converting means of Y, $C_1$ and $C_2$ into R G B signals.--

Column 1, lines 56 and 57, delete "according to the present invention comprises" and insert --comprising:--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 2, line 4, after "value." insert --The signal encoding apparatus also including encoding means for run-length coding said first, second and third binary signals.--

Column 2, lines 5 and 6, delete "according to the present invention comprises" and insert --comprising: decoding--;

Column 2, line 6, delete "receptive of" and insert --for converting a run length code into--;

Column 2, line 28, after "signals," insert --encoding means for run length coding said first, second and third binary signals; decoding means for converting the run length code into the first, second and third binary signals; and--

Column 2, line 51, delete "The" and insert --One example of the--;

Column 2, line 52, after "invention" insert --applied to motionless (or frozen) display signals--;

Column 2, lines 61 and 62, delete "based on a" and insert --initiated from the--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 2, line 62, after "and" delete "a" and insert --the--;

Column 2, lines 62 and 63, after "vertical synchronous" delete "signals and directs said given address to the image memory;" and insert --of the display signal--;

Column 3, line 10, delete "an image memory;";

Column 3, line 12, delete "moemry" and insert --memory--;

Column 3, line 13, delete "directs" and insert --generates--;

Column 3, line 14, after "according" insert --to the--;

Column 3, lines 16 and 17, delete "of an inputted video signal into the image signal encoding system" and insert --is identified to the original one--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 3, line 30, after "by" insert --logical conversion means to satisfy--;

Column 3, line 31, delete "formula" and insert --conditions--;

Column 3, line 34, delete "By such coding, image data amount can be reduced," and insert --coding the primary color data Y, $C_1$ and $C_2$ achieves a high data compression ratio, since black and white colors are mostly used and occupy most of the display,--;

Column 3, lines 53 and 54, delete "internal construction of" and insert --a-- and after "memory" insert --map--;

Column 3, line 59, after "a" insert --CRT--;

Column 3, line 61, delete "binarized" and insert --binary--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 3, line 61, after "images" insert --normally represented in eight colors. People often need to transfer this display information to a remote location or file it to use later. One way to achieve this is to pick up video signals of the display in a frame and handle (preferably in combination with high efficient data compression means) then as a bit map pattern regardless of information sources. The advantage of this "bit map transfer" method, which is in the fundamental concept for the CAPTAIN system, is capable of transferring a displayed image to a different kind of system (even to a facsimile receiver) regardless of the machine architecture, operating system (OS) and program language of a computer system.--;

Column 3, line 61, delete "produced" and insert --displayed--;

Column 3, line 63, delete "color tones" and insert --colors--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 3, line 64, after "shares" insert --a--;

Column 3, line 64, after "of" insert --the--;

Column 3, line 66, delete "is";

Column 3, line 66, delete "displayed than color image" and insert --appears among other frames--;

Column 3, line 68 to Column 4, line 1, delete "white and black data which occurs most frequently is represented by three bits of R, G and B" and insert --when coding a narrow white vertical line on a black row, it is necessary to code each "1" bit for run length coding for each line of R, G and B--.

Column 4, line 1, after "causing" insert --the--;

UNITED STATES PATENT AND TRADEMARK OFFICE
CERTIFICATE OF CORRECTION

PATENT NO. : 5,159,443

DATED : Oct. 27, 1992

INVENTOR(S) : Fumio Ando

It is certified that error appears in the above-identified patent and that said Letters Patent is hereby corrected as shown below:

Column 4, line 7, delete "reduce" and insert --reducing the--;

Column 4, lines 35 and 36, delete "so as to significantly reduce code amount";

Column 4, line 39, before "high" insert --a--; delete "rate" and insert --ratio--;

Column 4, line 51, after "frame" insert --of--; delete "are" and insert --is--;

Column 4, line 52, delete "skip" and insert --an all frame zero code is sent thereby skipping a--;

Column 4, line 56, after "value" insert --of--;

Column 4, line 65, delete "reconstract" and insert --reconstruct--.

Column 5, line 48, after "stopped" insert --until an entire frame of data is encoded--;

Column 5, line 54, delete "produced" and insert --manufactured--.

UNITED STATES PATENT AND TRADEMARK OFFICE
CERTIFICATE OF CORRECTION

PATENT NO. : 5,159,443
DATED : Oct. 27, 1992
INVENTOR(S) : Fumio Ando

It is certified that error appears in the above-identified patent and that said Letters Patent is hereby corrected as shown below:

Column 6, line 7, delete "CDROM" and insert --CD-ROM--.

Column 7, line 18, delete "filing" and insert --forming--.

Column 8, line 35, delete "arreangement" and insert --arrangement--.

Signed and Sealed this

Tenth Day of May, 1994

BRUCE LEHMAN

Attest:

Attesting Officer

Commissioner of Patents and Trademarks